United States Patent [19]

Lyakhevich et al.

[11] 4,279,865
[45] Jul. 21, 1981

[54] ORGANIC COMPOUND OXIDATION PLANT

[76] Inventors: Genrikh D. Lyakhevich, ulitsa Matusevicha, 3, kv. 146; Petr I. Belkevich, ulitsa Kulmana, 15, kv. 55, both of Minsk; Alexandr D. Rudkovsky, ulitsa Dvinskaya, 13, kv. 1, Novopolotsk; Alexandr E. Sokolovsky, ulitsa Olshevskogo, 33, korpus 1, kv. 67; Alexandr I. Kirilchik, ulitsa Yakuba Kolosa, 34, kv. 46, both of Minsk, all of U.S.S.R.

[21] Appl. No.: 107,538

[22] Filed: Dec. 27, 1979

[51] Int. Cl.³ ............................ B01J 14/00; B01J 19/26
[52] U.S. Cl. ...................................... 422/187; 422/189; 252/361; 208/13; 208/40; 208/44
[58] Field of Search ............... 422/129, 187, 188, 189, 422/224, 225; 252/361; 208/13, 40, 44; 210/23 R, 63 R, 21

[56] References Cited

U.S. PATENT DOCUMENTS

| 1,660,248 | 2/1928 | Beattie ............................. 208/13 X |
| 1,960,855 | 5/1934 | Sommer ............................... 422/225 |
| 2,222,468 | 11/1940 | Saunders et al. ................ 422/225 X |
| 2,370,277 | 2/1945 | Wetbly ................................. 208/13 |
| 2,897,054 | 7/1959 | Miley ............................... 208/13 X |
| 3,149,063 | 9/1964 | Brunel ................................. 208/13 |
| 3,693,325 | 9/1972 | Muller ............................ 252/361 X |

FOREIGN PATENT DOCUMENTS

| 47-14092 | 4/1972 | Japan ..................................... 422/224 |
| 165975 | 1/1964 | U.S.S.R. . |
| 321536 | 1/1972 | U.S.S.R. . |

OTHER PUBLICATIONS

Oil and Gas Industry Magazine (USSR), No. 2, p. 45-47, 1969.
G. H. Miley, "What to Do with Acid Sludge-The Miley Process", Petroleum Refiner, vol. 34, No. 9, pp. 138-141 (Sep. 1955).

Primary Examiner—Bradley Garris
Attorney, Agent, or Firm—Lackenbach, Lilling & Siegel

[57] ABSTRACT

The organic compound oxidation plant comprises vessels for organic compounds and for liquid-phase oxidizer, and a mixer for mixing organic compounds. The plant further includes a furnace for heating organic compounds and a reactor for oxidizing organic compounds. The top portion of the reactor is made cylindrical and accommodates a spraying unit for the supply of organic compounds and a liquid-phase oxidizer dispersion unit. The bottom portion of the reactor is made conical and accommodates a spraying unit additionally mounted therein at an angle to the reactor horizontal axis. Said latter spraying unit has nozzles ensuring the supply of organic compounds to the conical surface of the reactor. The nozzles of the spraying unit are provided with screens serving to ensure directional movement of organic compounds to the spraying unit and with openings for the supply of organic compounds, above which openings guide deflectors are mounted. The organic compound oxidation plant also includes, mounted in series, a reducing unit whose input is connected with the reactor output, a degassing unit and a froth breaker. Mounted in the expanded top portion of the froth breaker is a hollow shaft on which there are secured nozzles for the supply of organic compounds and coiled plates with blades.

8 Claims, 6 Drawing Figures

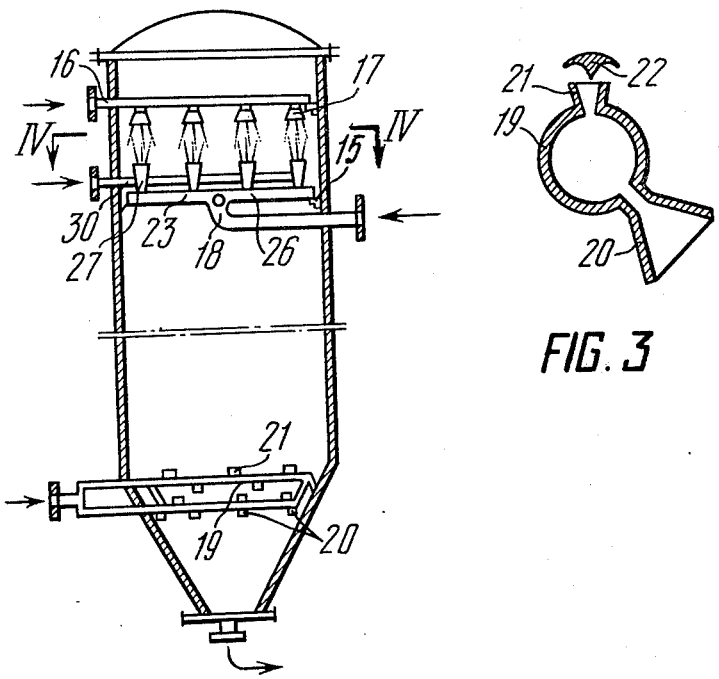
FIG. 2
FIG. 3
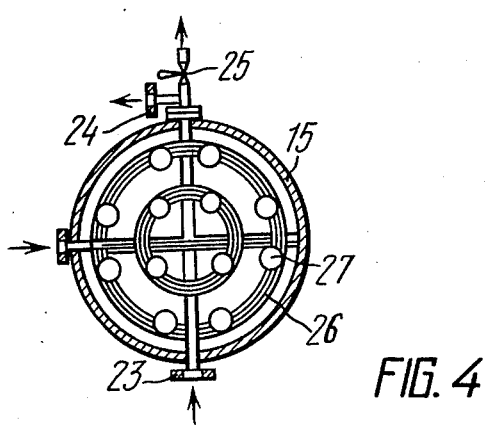
FIG. 4

4,279,865

ORGANIC COMPOUND OXIDATION PLANT

FIELD OF THE INVENTION

The present invention relates to chemical engineering and, more particularly, it relates to organic compound oxidation plants designed for processing sulfuric acid waste and sludge with a view to producing boiler fuel, asphalts and asphlatite.

This invention can be used most advantageously in the petroleum-processing, petrochemical and coal-tar chemical industry.

BACKGROUND OF THE INVENTION

At present, numerous oil-processing, petrochemical and coking plants of industrially developed countries generate over two million tons of acid waste a year, such as spent sulfuric acid, sludge and sulfuric-acid discharges.

The presence of such waste causes high transportation costs and allocation of large areas for waste disposal.

In addition, such products are hard to utilize. Very often they contain components of low biochemical oxidizability, pollute the atmosphere with sulfur dioxide, and ground water and soil - with sulfuric acid.

The development of organic compound oxidation plants, with a view to producing boiler fuel, is an urgent need in view of the current shortage of petroleum products and fuel in a number of countries.

Apart from that, the existing plants for the purpose suffer from high energy use and metal consumption, difficulties in assembly and maintenance, and large working areas that are necesary.

There is known in the art a plant for producing fuels, road and construction asphalts, which utilizes for sulfuric acid oxidation of a mixture of sludge with oil tar or flux oil upon heating (cf., U.S.S.R. Inventor's Certificate No. 165,975, class C 10 C 3/04 "Bulletin of Inventions, Discoveries, Industrial Designs and Trademarks" N 20 published in 1964).

This prior art plant includes an oxidizing reactor, a furnace for heating the reactor, a separator for separating particles of products from the vapor-gas phase, and an absorber.

The prior art solution suffers from high energy- and metal consumption, batch nature of the process, lengthy time required for breaking the froth formed in the reactor, all of which affect the plant efficiency. The absence of a device for dispersing sulfuric acid in the sludge-oil tar mixture causes inadequate contacting of the starting reactants, which results in partial coking of the products and clogging of the reactor and pipelines with coke.

There is also known a plant for producing asphalts from sludge or directly distilled oil tar, comprising vessels for sludge and directly distilled oil tar, a mixer for mixing them, a reactor, a furnace for heating the reactor, a separator for the separation of vapor-gas mixture, an absorber, a cooler and pumps (cf., Neftianaya i gazovaiya promyshlennost–Oil and Gas Industry Magazine, No. 2, 1969, pp. 45-47).

Said prior art solution fails to provide for adequate contacting of the starting reactants because of the imperfection of the mixing device.

In addition, said prior art plant suffers from high energy and metal consumption and is characterized by the batch nature of the process.

Corrosion and deformation of the reactor occur in the prior art plant due to high temperatures and their considerable difference over the height of the apparatus, thus resulting in reduced service life of the plant.

Since the reactor is heated with smoke gases, its walls become overheated, which results in local coking of the reaction mass.

There is further known in the art a plant for low-temperature decomposition of sulfuric-acid waste, using a Miley retort (cf., Miley G.G., Petroleum Refiner, published in 1955, Vol. 34, No. 9, pp. 138–141).

The plant consists of a mixing conveyor, screw hoist, retort, cyclone, mixers, vessels, separator, a hopper for coke, cyclones, furnace, levelling conveyor, and scraper conveyer.

The prior art plant suffers from marked corrosion and erosion of moving scraper conveyors, as well as from high energy and metal consumption. The plant requires a large working area, is difficult to maintain, unreliable in operation and is inefficient.

Also known is an organic compound oxidation plant comprising a vessel for liquid-phase oxidizer, a vessel for organic compounds, a mixer for mixing organic compounds with the liquid-phase oxidizer, a furnace for heating organic compounds, a reactor for oxidizing organic compounds, a cooler and pumps, chosen by the present inventors as prototype (cf., U.S.S.R. Inventor's Certificate No. 321,536, class C 10 C 3/12, "Bulletin of Inventions, Discoveries, Industrial Designs and Trademarks" N 35 published in 1971.

However, said latter prior art plant is characterized by high metal- and energy consumption, low efficiency, long duration of the process, complicated control and maintenance and low technical and economic parameters, as well as a required large working area.

In addition, said prior art plant lacks units and devices providing for fine dispersion of a highly viscous liquid-phase oxidizer over the volume of organic compounds.

BRIEF DESCRIPTION OF THE INVENTION

It is an object of the present invention to develop an organic compound oxidation plant equipped with series-connected units ensuring the pre-mixing of organic compounds and liquid-phase oxidizer.

It is another object of the present invention to provide for reliable conveyance of organic compounds (without the separation of components) to the reactor wherein the finest possible dispersion of the mixture over the entire volume of organic compounds is ensured.

It is yet another object of this invention to reduce the duration of the process, thanks to improved heat- and mass transfer and increased surface of inter-phase contact, by providing appropriate structural features in the reactor.

It is a further object of the present invention to ensure efficient breaking of the froth formed upon separation of the vapor-gas phase, thanks to the novel structural embodiment of the froth breaker.

Still further objects of the invention include the reduction of the amount of metal and energy consumed upon manufacture and operation of the plant, as well as improvement of other technical and economic parameters.

Said objects are attained from the fact that the herein disclosed organic compound oxidation plant comprising vessels for organic compounds and for liquid-phase oxidizer, a mixer for mixing organic compounds with the liquid-phase oxidizer, a furnace for heating organic compounds, a reactor for oxidizing organic compounds, a cooler and pumps, according to the invention, further includes, mounted in series with each other, a reducing unit whose input is connected with the output of the reactor accommodating in the top portion thereof a spraying unit for the supply of organic compounds and a liquid-phase oxidizer dispersing unit, a froth breaker having a distributing device with nozzles for the supply of organic compounds and a degassing unit whose input is connected with the bottom portion of the froth breaker.

Such an interconnection of structural elements helps intensify the process thanks to pre-mixing the organic compounds and liquid-phase oxidizer.

In addition, in the herein disclosed plant the top portion of the reactor is made cylindrical while its bottom portion is made conical and accommodates, additionally mounted therein, a spraying unit with nozzles set at an angle to the reactor's horizontal plane serving to ensure the supply of organic compounds to the conical surface of the reactor.

This structural embodiment of the reactor helps preclude the formation of stagnation zones and ensure the increase of inter-phase contact, as well as improve heat- and mass transfer between the liquid-phase oxidizer and organic compounds.

It is expedient that the nozzles of the spraying unit be provided with screens serving to ensure directional movement of organic compounds to the spraying unit, thereby precluding the coking of the mixture on the spraying unit.

It is also expedient that the dispersing unit be provided with pipes having an adjusting valve connected to an oxidizer inlet manifold, which helps eliminate the polymerization of organic compounds in the pipes and in the liquid-phase oxidizer inlet manifold.

In addition, it is expedient that the nozzles of the oxidizer spraying unit have openings for the supply of organic compounds, with guide deflectors mounted above said opening in order to prevent the deposition of coke on the spraying units.

It is further expedient that the expanded top portion of the froth breaker accommodate a hollow shaft having nozzles for the supply of organic compounds and coiled plates with blades secured thereon.

These structural embodiment of the froth breaker provide reduced times for froth breaking.

BRIEF DESCRIPTION OF THE DRAWINGS

Other objects and advantages of the present invention will be more apparent upon considering the following detailed description of an exemplary embodiment thereof, with due reference to the accompanying drawings in which:

FIG. 2 is a general view of the plant reactor for oxidizing organic compounds;

FIG. 3 shows a nozzle of a reactor spraying unit mounted in the conical portion of the reactor;

FIG. 4 is a section taken on the line IV—IV of FIG. 2;

DESCRIPTION OF THE PREFERRED EMBODIMENT

Figure 1:
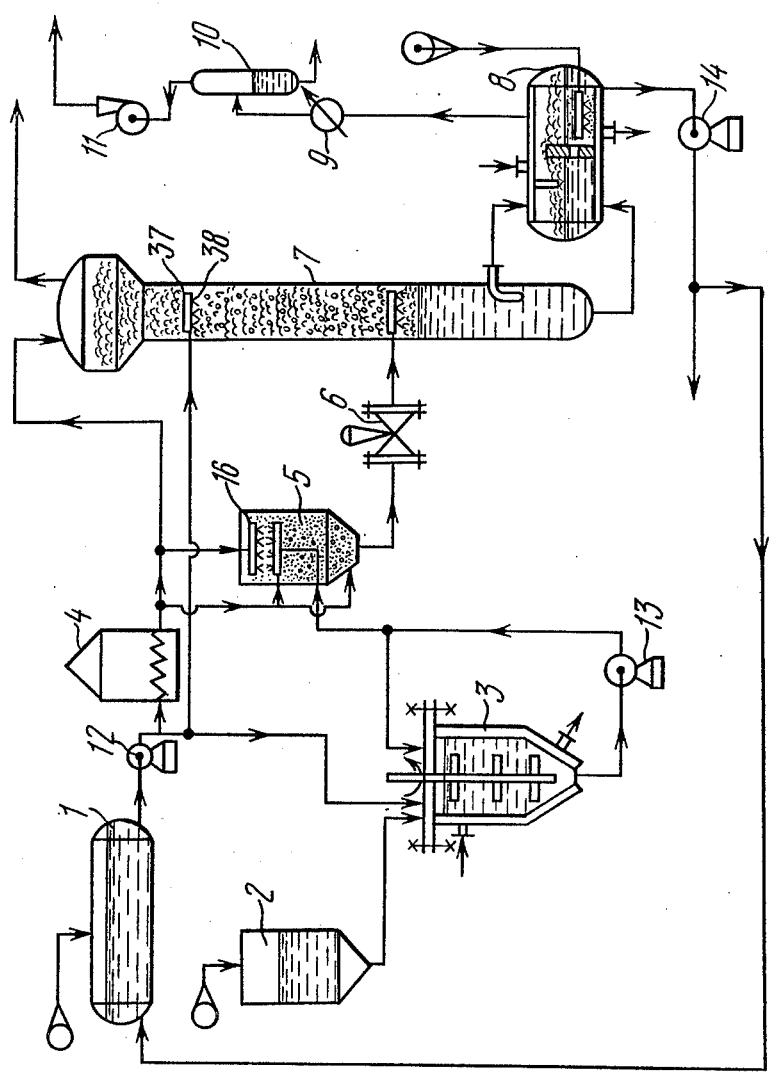
FIG. 1 shows diagrammatically the organic compound oxidation plant according to the invention.

Referring now to FIG. 1 of the drawings, the herein disclosed organic compound oxidation plant comprises a vessel 1 for organic compounds, a vessel 2 for liquid-phase oxidizer, a mixer 3 for mixing organic compounds with the liquid-phase oxidizer, a furnace 4 for heating organic compounds, a reactor 5 for oxidizing organic compounds, a reducing unit 6, a froth breaker 7, a degassng unit 8, a condenser-cooler 9, a vacuum tank 10, a vacuum-producing device 11 and pumps 12, 13, 14.

Figure 5:
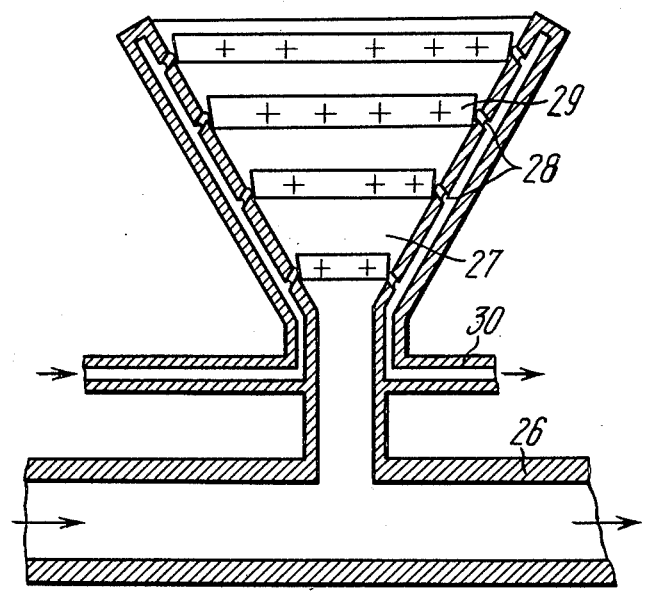
FIG. 5 shows a dispersion unit nozzle.

The reactor 5 (FIG. 2), whose body 15 is made cylindrical while its bottom portion is made conical, includes an organic compound spraying unit 16 with nozzles 17 and a liquid-phase oxidizer dispersion unit 18 built in the top portion of the reactor 5. Mounted in the bottom portion of the reactor 5 is a spraying unit 19 (FIG. 3) with nozzles 20 set at an angle to the horizontal plane of the reactor 5. The spraying unit 19 further includes nozzles 21 provided with screens 22 serving to ensure directional movement of organic compounds to the spraying unit 19. The liquid-phase oxidizer dispersion unit 18 (FIG. 4) is provided with pipes 23, 24 with an adjusting valve 25 connected to an oxidizer inlet manifold 26 on which are mounted oxidizer inlet nozzles 27 (FIG. 5). The nozzles 27 have openings above which guide deflectors 29 are mounted. The liquid-phase oxidizer dispersion unit 18 is provided with a manifold 30 for the introduction of organic compounds in the openings 28 of the nozzles 27.

The froth breaker 7 (FIG. 6) includes a body 31 having an expanded top portion which accommodates a hollow shaft 33 set in a bearing 32, with organic compound supply nozzles 34 and coiled plates 35 with blades 36 secured on said shaft 33, and a distributing device 37 with nozzles 38 located in the middle portion of the froth breaker 7.

The organic compound oxidation plant according to the present invention operates in the following manner.

Organic compounds from the vessel 1 are fed by means of the pump 12 to the mixer 3. The oxidizer (sludge or spent sulfuric acid) from the vessel 2 is also fed to the mixer 3 where the organic compounds and oxidizer are pre-mixed.

Pre-mixing serves to reduce the viscosity of the mixture and, consequently, improve the ease with which it is pumped through the pipelines and the degree of its dispersion in the reactor 5.

Part of organic compounds from the vessel 1 are supplied to the furnace 4 where they are heated to the process temperature and fed on to the reactor 5. The resulting mixture of organic compounds and oxidizer from the mixer 3 is also fed to the reactor 5 by means of the pump 13. The supply of oxidizer to the reaction space is effected via the manifold 26 of the dispersion unit 18 with the aid of the nozzles 27 (FIG. 2). In order to preclude coking of the mixture, it is circulated continuously through the manifold 26 and pipe 24 (FIG. 4). The flow rate of the mixture is adjusted by means of the valve 25.

In order to preclude the coking of the mixture, organic compounds are fed to the nozzles 27 via the manifold 30, said organic compounds being injected through the openings 28 and thrown over to the walls of the nozzles 27 by means of the deflectors 29.

Organic compounds from the furnace 4 are fed to the spraying unit 16, and via the nozzles 17, are introduced in the reaction space of the reactor 5 to meet with the oxidizer flow. As a result of the oxidizer contact with the heated organic compounds, a frothing mass is formed which is then removed from the reactor 5.

In order to preclude the deposition of coke-type organic compounds in the bottom portion of the reactor 5, part of the organic compounds are supplied via the nozzles 20 of the spraying unit 19 to the surface of the conical portion of the reactor. For precluding the formation of coke on the spraying unit 19 itself, organic compounds are fed through the nozzles 21 and thrown against its surface by the screens 22.

Figure 6:
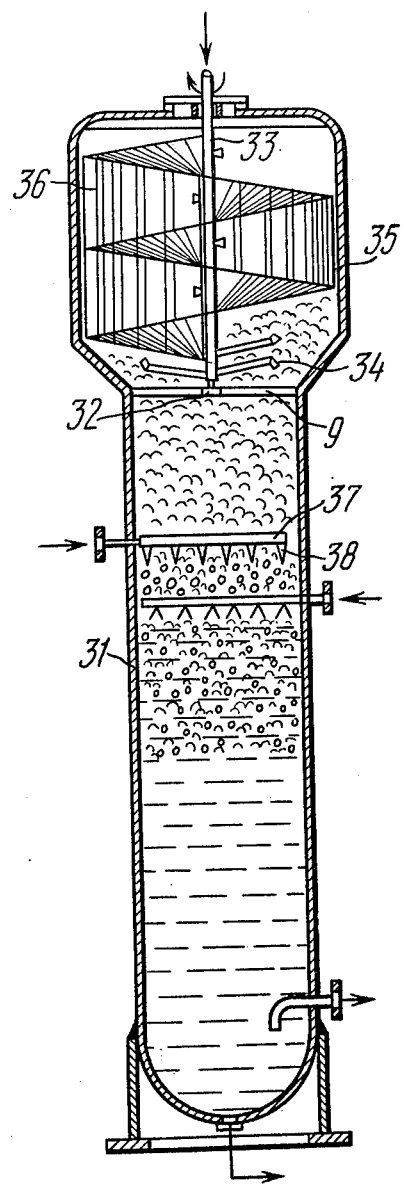
FIG. 6 is a general view of the froth breaker of the organic compound oxidation plant according to the invention.

The reaction mass from the reactor 5 (FIG. 1) is fed to the froth breaker 7 via the reducing unit 6. Simultaneously, organic compounds from the vessel 1 are supplied to the froth breaker via the distributing device 37 with the nozzles 38 (FIG. 6). Under the effect of multiple jets of cold organic compounds, the froth is broken down mechanically and due to the condensation of part of low-boiling vapors. Then, the remaining froth is fed to the diverging top portion of the froth breaker 7 and broken as follows: part of organic compounds from the furnace 4 (FIG. 1) are supplied to the froth breaker 7, namely, to the hollow shaft 33 (FIG. 6) and then into the nozzles 34 which emit jets of organic compounds against the coiled plates 35 and blades 36, as well as the expanded top portion of the froth breaker body and part of the adjoining space.

As a result of the effect of jets of hot organic compounds and the contact of bubbles with the coiled plates 35 and blades 36, the froth is effectively broken. The elimination of "dead zones" and complete breaking of the froth is attained owing to rotation of the froth breaker set in the bearing 32.

Gases and vapors of low-boiling fractions, separated upon the breaking of the froth, are removed from the top portion of the froth breaker 7.

The reaction mass from which sulfurous gas, water vapor and low-boiling fractions have been partly removed is supplied from the froth breaker 7 to the degassing unit 8 (FIG. 8) wherein traces of gases dissolved in products are removed owing to the injection of inert gas.

A more complete removal of traces of sulfurous gas is effected by setting a reduced pressure in the degassing unit with the aid of the vacuum-producing device 11.

Blow-off vapors and gases from the degassing unit 8 are directed to the vacuum tank 10 via the condenser-cooler 9.

In the vacuum tank 10 there takes place the separation of liquid products from uncondensed vapors and gases. Uncondensed vapors and gases from the top portion of the vacuum tank 10 are directed to the vacuum-producing device 11 while the liquid products (condensate) are removed from the bottom portion of the vacuum tank 10.

The main product from the bottom portion of the degassing unit 8 is fed by means of the pump 14 to storage while part of said product is recirculated to the vessel 1.

What is claimed is:

1. An organic compound oxidation plant, comprising:
   a vessel for organic compounds;
   a vessel for a liquid-phase oxidizer;
   a mixer communicating with the vessel for the organic compounds and with the vessel for the liquid-phase oxidizer, which forms an oxidizer premix.
   a furnace for heating the organic compound, communicating with said vessel for organic compounds;
   a reactor having spray means communicating with said furnace for introducing the organic compounds therein, and dispersing means communicating with the mixer for introducing the oxidizer premix therein, to thereby form a reaction mass, and wherein said spray means and said dispersing means are arranged opposite each other and adapted so that their respective flows intimately contact each other;
   a reducing means communicating with said reactor, to receive the reaction mass;
   a froth breaker having an upper enlarged portion and a lower narrower portion, the froth breaker communicating with said furnace, with means for receiving the organic compounds therein;
   said froth breaker also communicating with said organic compound vessel, having additional means for receiving the organic compounds therein;
   said froth breaker also communicating with said reducing unit, with means for receiving the reaction mass therein;
   a degassing unit communicating with said froth breaker to receive the reaction mass.

2. The plant according to claim 1, wherein said reactor has an upper cylindrical portion accommodating said spray means and said dispersing means, and a lower conical portion housing a second spray means with injection nozzles installed at an angle to the horizontal plane of the reactor adapted to introduce the organic compounds against the conical surface of said reactor.

3. The plant according to claim 2, wherein said injection nozzles have means to ensure the directional movement of the organic compounds toward said second spray means.

4. The plant according to claim 2, wherein said injection nozzles have openings for the introduction of organic compounds, and guide means arranged above said openings.

5. The plant according to claim 3, wherein said directional movement means are screens.

6. The plant according to claim 1, wherein the dispersing means of the reactor are provided with control means to regulate the admission of oxidizer premix in the dispersing means.

7. The plant according to claim 1, wherein the froth breaker's upper enlarged portion accommodates a hollow shaft with means for introducing organic compounds therein.

8. The plant according to claim 7, wherein said introducing means comprise nozzles and said froth breaker also includes coiled plates with blades attached thereto.

* * * * *